(12) United States Patent
Rector et al.

(10) Patent No.: US 8,331,225 B2
(45) Date of Patent: Dec. 11, 2012

(54) QUALITY OF SERVICE BASED UPON LOCATION

(75) Inventors: Jay Daryl Rector, Loganville, GA (US); John Potts Davis, III, Marietta, GA (US); Justin Michael Anthony McNamara, Atlanta, GA (US)

(73) Assignee: AT&T Mobility II, LLC, Atlanta, GA (US)

( * ) Notice: Subject to any disclaimer, the term of this patent is extended or adjusted under 35 U.S.C. 154(b) by 452 days.

(21) Appl. No.: 12/631,952

(22) Filed: Dec. 7, 2009

(65) Prior Publication Data

US 2011/0134765 A1 Jun. 9, 2011

(51) Int. Cl.
*H04L 12/26* (2006.01)
(52) U.S. Cl. ....................................................... 370/229
(58) Field of Classification Search .......... 370/229–236, 370/310, 328, 342–349, 464, 465; 455/422, 455/432, 433, 443, 446, 456
See application file for complete search history.

(56) References Cited

U.S. PATENT DOCUMENTS

| | | | |
|---|---|---|---|
| 6,591,105 B1 * | 7/2003 | Hussain et al. | 455/444 |
| 6,836,653 B1 | 12/2004 | Kang | |
| 7,010,305 B2 * | 3/2006 | Immonen et al. | 455/452.2 |
| 7,035,647 B2 * | 4/2006 | de Verteuil | 455/456.1 |
| 7,116,990 B2 | 10/2006 | Maanoja | |
| 7,428,510 B2 | 9/2008 | Titus | |
| 7,916,691 B2 * | 3/2011 | Kopplin | 370/329 |
| 8,126,439 B1 * | 2/2012 | Sankaranaraynan et al. | 455/414.1 |
| 2007/0002868 A1 * | 1/2007 | Qian et al. | 370/395.21 |
| 2007/0135136 A1 * | 6/2007 | Ische | 455/456.1 |
| 2007/0230420 A1 * | 10/2007 | Bumiller et al. | 370/338 |
| 2008/0076385 A1 * | 3/2008 | Mayer et al. | 455/407 |
| 2008/0293436 A1 | 11/2008 | Fok | |
| 2009/0012885 A1 | 1/2009 | Cahn | |

\* cited by examiner

*Primary Examiner* — Dmitry H Levitan
(74) *Attorney, Agent, or Firm* — Hope Baldauff Hartman, LLC

(57) ABSTRACT

Devices, systems and methods are disclosed which relate to implementing location-based quality of service (QoS) for applications running over a mobile communications network. A user sets up one or more "geofenced area(s)" delimited by position coordinates and associated with their mobile computing device. Also associated with each geofenced area is a "QoS Profile" listing a plurality of requested QoS attributes for traffic going to/from the user's mobile computing device or specific applications running on his/her mobile computing device over the mobile communications network. When the user enters a particular geofenced area associated with their mobile computing device, the QoS Profile associated with that geofenced area is loaded as the active QoS Profile for the mobile computing device. Additionally, as part of their QoS Profiles, a user optionally sets up other conditions which trigger changes in requested QoS attributes for their traffic over the mobile communications network. In embodiments of the present invention, the motion of the user is a condition which triggers changes in requested QoS attributes for their traffic over the mobile communications network.

15 Claims, 7 Drawing Sheets

QUALITY OF SERVICE BASED UPON LOCATION

BACKGROUND OF THE INVENTION

1. Field of the Invention

The present invention relates to the field of communications networks and in particular, relates to devices, systems and methods for dynamically provisioning quality of service (QoS) on a communications network.

2. Background of the Invention

The need to implement quality of service (QoS) standards in mobile device communications networks is well known in the art. As mobile phones and mobile phone networks incorporate functions (i.e., email, SMS messages, VoIP, streaming multimedia, etc.) with wildly disparate transmission requirements, it has become apparent that standards need to be put in place on the communications networks carrying such traffic for these functions to work to the satisfaction of their users. QoS standards range from specific guarantees on the transmission of all data flows (i.e., guaranteed ranges on latency, delay, jitter, throughput, etc.) to a focus on more qualitative measures of the user experience. For example, a service provider may only implement a "best effort" protocol to forward data on their network, but by sufficiently "over provisioning" bandwidth on their network fulfill the communications needs of their users. Implementations of QoS occur through many different transmission protocols, including IntServ, DiffServ, etc. The QoS standards that are implemented in the communications network are specified in Service Level Agreements (SLAs) between the user and the service provider. These SLAs typically take the form of different subscriptions the user may purchase, for example, "Premium", "Regular", "Budget", etc., reflecting more or less stringent QoS requirements.

As the capabilities of mobile phones expand, the users of such devices, in some sense, are becoming more complex at the same time. The telecommunications industry has come to understand that a single user may adopt multiple "personas", in terms of their communications requirements, depending on their current context (at home, at work, in their car, etc.). For example, a user at work may have very different communications requirements from the same user at home. For instance, the user at work may not be willing to tolerate transmission errors in a videoconferencing session that they would tolerate streaming a movie at home. Implementing the same QoS standards for all of the personas the user presents to the network means that the user may, in some contexts, not experience the network performance he/she needs, or that network resources that could have been used for more critical applications are tied up instead guaranteeing performance that the user neither needs nor wishes to pay for.

Implementations of QoS are still in their infancy. Thus, there is a need for communications networks to adapt the QoS standards implemented for a user based on the persona the user presents to the network.

SUMMARY OF THE INVENTION

The present invention discloses systems, methods, and devices implementing location-based quality of service (QoS) for applications running over a mobile communications network. A user sets up one or more "geofenced area(s)" delimited by position coordinates and associated with their mobile computing device. Also associated with each geofenced area is a "QoS Profile" listing a plurality of requested QoS attributes for traffic going to/from the user's mobile computing device or specific applications running on his/her mobile computing device over the mobile communications network. When the user enters a particular geofenced area associated with their mobile computing device, the QoS Profile associated with that geofenced area is loaded as the active QoS Profile for the mobile computing device. Additionally, as part of their QoS Profiles, a user optionally sets up other conditions which trigger changes in requested QoS attributes for their traffic over the mobile communications network. In embodiments of the present invention, the motion of the user is a condition which triggers changes in requested QoS attributes for their traffic over the mobile communications network.

In one exemplary embodiment of the present invention, location-based QoS is implemented over a wireless mobile communications network accommodating both circuit-switched and packet-switched data. When the user enters a geofenced area, a notice is sent to a QoS Logic running on a Home Location Register (HLR) server, which then loads the QoS Profile associated with that geofenced area as the active QoS Profile. Thereupon, when the device sends a request to a Serving Packet Data Support Node (SPDSN) to initiate a session requiring QoS, the active QoS Profile is downloaded from the HLR to the SPDSN. Based on the requested QoS, the downloaded active QoS Profile, and other network factors including network congestion, a negotiated level of QoS for the session is determined by the SPDSN and implemented over the mobile device communications network.

In a further exemplary embodiment of the present invention, the user, via user input to the mobile computing device, is able to override the settings of the active QoS profile. In another further exemplary embodiment of the present invention, a subscriber is able to act as a "location-based QoS administrator" for other mobile computing devices on his/her account with the service provider of the mobile device communications network. This allows the subscriber to set up QoS profiles for those mobile computing devices.

DETAILED DESCRIPTION OF THE INVENTION

Figure 1:
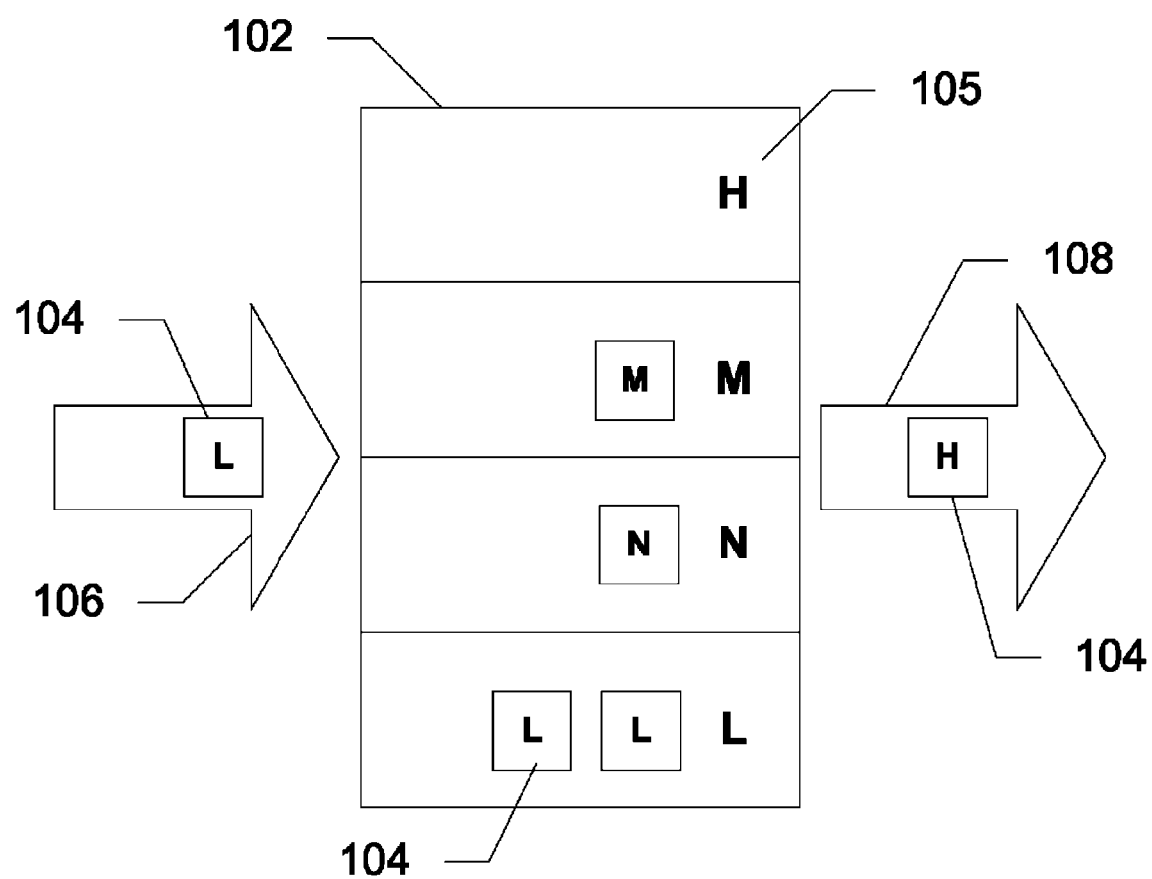
FIG. 1 displays one modality for implementing QoS at a network element of a mobile communications network.

The present invention discloses systems, methods, and devices implementing location-based quality of service (QoS) for applications running over a mobile communications network. A user sets up one or more "geofenced area(s)"

delimited by position coordinates and associated with their mobile computing device. Also associated with each geofenced area is a "QoS Profile" listing a plurality of requested QoS attributes for traffic going to/from the user's mobile computing device or specific applications running on his/her mobile computing device over the mobile communications network. When the user enters a particular geofenced area associated with their mobile computing device, the QoS Profile associated with that geofenced area is loaded as the active QoS Profile for the mobile computing device. Additionally, as part of their QoS Profiles, a user optionally sets up other conditions which trigger changes in requested QoS attributes for their traffic over the mobile communications network. In embodiments of the present invention, the motion of the user is a condition which triggers changes in requested QoS attributes for their traffic over the mobile communications network.

In one exemplary embodiment of the present invention, location-based QoS is implemented over a wireless mobile communications network accommodating both circuit-switched and packet-switched data. When the user enters a geofenced area, a notice is sent to a QoS Logic running on a Home Location Register (HLR) server, which then loads the QoS Profile associated with that geofenced area as the active QoS Profile. Thereupon, when the device sends a request to a Serving Packet Data Support Node (SPDSN) to initiate a session requiring QoS, the active QoS Profile is downloaded from the HLR to the SPDSN. Based on the requested QoS, the downloaded active QoS Profile, and other network factors including network congestion, a negotiated level of QoS for the session is determined by the SPDSN and implemented over the mobile device communications network.

In a further exemplary embodiment of the present invention, the user, via user input to the mobile computing device, is able to override the settings of the active QoS profile. In another further exemplary embodiment of the present invention, a subscriber is able to act as a "location-based QoS administrator" for other mobile computing devices on his/her account with the service provider of the mobile device communications network. This allows the subscriber to set up QoS profiles for those mobile computing devices.

As used herein and throughout this disclosure, a "geofenced area" refers to a virtual perimeter set up in space, associated with which is a means of detection that detects whenever a particular device enters or leaves the virtual perimeter. In many applications, implementation of such a scheme amounts to provisioning the device with a Global Positioning System (GPS) connection, so that as long as the device is on, the device knows its location, and then inputting a set of positional attributes into the device or network to demarcate the limits of the geofenced area. For example, a user of such a device enters a latitude and longitude, corresponding to the center of the geofenced area, and a radius value, corresponding to a radius around the center marking the limit of the geofenced area. In other applications, other modalities are used to track the location of the device. If the device is a mobile phone attached to an appropriately provisioned mobile phone network, the "enhanced cell ID" of the mobile phone may be used to fix its present location with some degree of accuracy.

As used herein and throughout this disclosure, a "mobile computing device" refers to any information-processing mobile device able to maintain a connection to a network over which it exchanges information with other mobile devices or remote hosts. Examples of such mobile computing devices include laptop computers; personal digital assistants (PDAs); netbooks; mobile phones; smartphones; etc. Examples of networks over which such devices communicate include GSM networks, GPRS networks, GSM EDGE networks, UMTS networks, etc.

As used herein and throughout this disclosure, a "mobile communications network" is a network over which a mobile computing device exchanges information.

As used herein and throughout this disclosure, "location-based QoS" refers to a QoS provided by a mobile communications network to an application or mobile computing device using that network whose particular attributes are dependent on the position of the mobile computing device.

As used herein and throughout this disclosure, a "subscriber" of a mobile communications network refers to an individual or entity that has been authorized to change account settings, including QoS Profiles, for one or more users of the mobile communications network.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

For context, FIG. 1 displays one modality for implementing QoS at a network element 102 of a mobile communications network. The scheme illustrated in FIG. 1 is typical of one aspect of "DiffServ" implementations of QoS over a mobile communications network. In one embodiment of this scheme, network element 102 is implemented by a stand-alone device such as a router, and in another embodiment of this scheme, network element 102 is implemented as a policy enforcement function of, for example, a gateway GPRS support node (GGSN). A plurality of data packets 104 entering this network element via an input link 106 has already been "marked" by a classifying network element as belonging to one of four priorities: "high"; "medium"; "normal"; and "low". Examples of data packets that, in some schemes, are marked as "high priority" include network management commands and Voice over Internet Protocol (VoIP) traffic. Examples of "medium priority" traffic, in some schemes, include streaming multi-media files. Examples of "normal priority" traffic, in some schemes, include web browsing and email. An example of "low priority" traffic, in some schemes, is peer-to-peer file sharing. Network element 102 supports four queues 105 into which traffic of each priority is segregated, and then output via an output link 108 according to an appropriate algorithm. For example, an appropriate algorithm may be one which reserves a fixed proportion of the bandwidth of network element 102 to the high priority queue, a fixed proportion of the bandwidth to the medium priority queue, etc. Such an algorithm may also reserve a preponderance of network element 102's memory resources for the higher priority queues, so that such high priority traffic is much less likely to be dropped.

Figure 2:
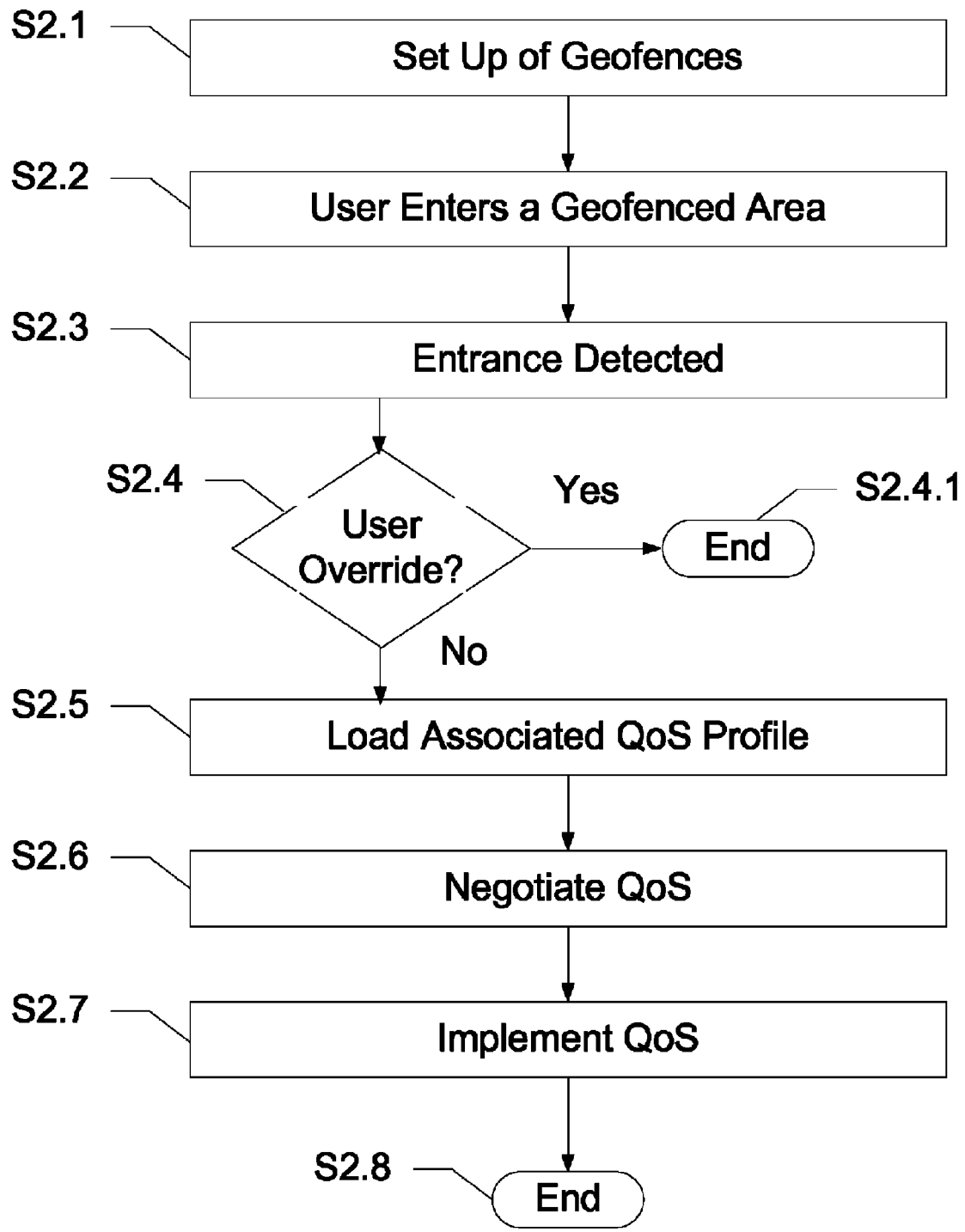
FIG. 2 displays a method of implementing location-based QoS, according to an exemplary embodiment of the present invention.

FIG. 2 displays a method of implementing location-based QoS, according to an exemplary embodiment of the present invention. The method begins as the user has "set up" a plurality of geofenced areas, S2.1. Setting up such an area entails marking the boundaries of the area and selecting the desired QoS attributes to be associated with that area via a QoS Profile. In some embodiments, setting up also includes establishment of a "default" QoS Profile to be set as active when the user is not inside the boundaries of any geofenced area. In setting up each geofenced area, the user takes account of his/her means of connection to the mobile communications network. For example, if the user wishes to connect through a femtocell access point in a particular location, the bandwidth of the underlying broadband connection may not be large enough to support a high level of QoS, regardless of his/her communications needs. Conversely, if the user has provisioned the femtocell access point with large bandwidth, the user may wish to impose high QoS requirements on communications from this location. Note that merely provisioning the femtocell connection with large bandwidth is not sufficient to ensure high QoS, because once data packets enter the service provider's network they may have to cross many external networks before they reach their destination.

The method of FIG. 2 continues as the user enters a particular geofenced area, S2.2, and the entrance by the user to the geofenced area is detected, S2.3. At this point, the user is queried to see if he/she prefers to override the change of the active QoS Profile to that of the just-entered geofenced area, S2.4. If the user prefers to override the change of active QoS Profile, no change in the active QoS Profile is made, and the method concludes, S2.4.1. Note that such user override ability is useful in cases where the user has multiple means with which to connect to the mobile communications network. For example, the user may be in a location with both femtocell and the usual radio access to the mobile communications network. If the user chooses not to override the change of active QoS, then mobile communications network infrastructure loads the QoS Profile associated with the just-entered geofenced area, S2.5. When the user next requests a session on the mobile communications network requiring a certain level of QoS, the infrastructure of the mobile communications network receives the QoS request from the mobile computing device. For example, this request may be made by loading an application on the user's mobile computing device which has certain latency or jitter requirements. The active QoS Profile for the user, based on other network factors, such as the amount of network congestion, negotiates an actual level of QoS to be assigned to the user-initiated session, S2.6. In some embodiments, the active QoS Profile sets maximum values of QoS attributes to which QoS requests from the user must comply. Finally, the infrastructure of the mobile communications network implements the negotiated QoS for the user-initiated session, S2.7. Such implementation takes many different forms depending upon the QoS standards in place on the network, and the protocols used to implement those standards. When the implementation of the negotiated QoS is completed, the method ends, S2.8.

Figure 3:
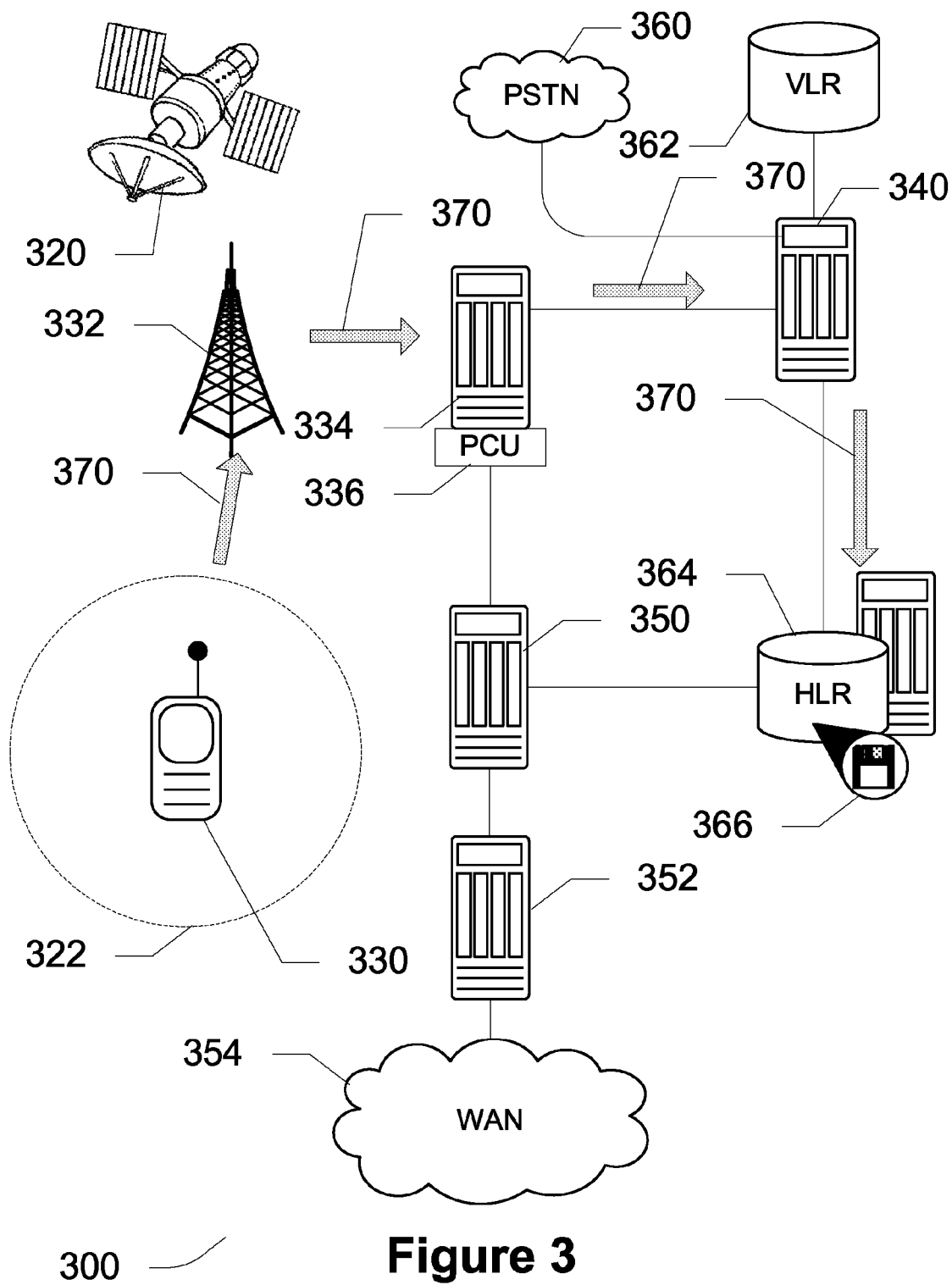
FIG. 3 displays a schematic diagram of the flow of information over a mobile communications network when a mobile device attached to the network has entered a "geofenced" area, according to an exemplary embodiment of the present invention.

FIG. 3 displays a schematic diagram of the flow of information over a mobile communications network 300 when a mobile computing device 330 has entered a "geofenced" area 322, according to an exemplary embodiment of the present invention. In this embodiment, mobile computing device 330 notifies a location-based QoS logic 366 on a Home Location Register (HLR) server 364 that the user of mobile computing device 330 attached to network 300 has entered geofenced area 322. Mobile communications network 300 includes mobile computing device 330, a plurality of GPS satellites 320, a base station 332, a base station controller 334, a mobile switching center (MSC) 340, a serving packet data support node (SPDSN) 350, a gateway packet data support node (GPDSN) 352, a wide area network (WAN) 354, a public switched telephone network (PSTN) 360, a Visitor Location Register (VLR) 362, and Home Location Register (HLR) server 364. Base station 332 provides a radio link between mobile computing device 330 and the rest of mobile communications network 300. Base station controller 334 handles the allocation of radio channels supported by base station 332 and provides a link to MSC 340. Via a packet control unit 336 integrated into base station controller 334, packet data is transmitted to SPDSN 350. Packet control unit 336 is a link for any packet data transmitted to or from mobile computing device 330 to SPDSN 350. Packet control unit 336 is responsible for routing packet data into the packet data switching system of mobile communications network 300. SPDSN 350 is responsible for setting up and maintaining the packet data connection between mobile computing device 330 and mobile communications network 300, and providing a connection to external packet networks, such as wide area network 354, via GPDSN 352. MSC 340 is responsible for registration of mobile computing device 330 on mobile communications network 300, setting up the end-to-end connection between mobile computing device 330 and a telephony device for voice calls, and maintaining a connection to public switched telephone network 360. In communication with MSC 340 is Visitor Location Register (VLR) 362, which maintains of database of all mobile computing devices served by MSC 340 and Home Location Register (HLR) server 364, which maintains a database of subscriber data for users of mobile communications network 300. The subscriber data includes subscribed services, uploaded QoS Profiles for the subscriber, and the subscriber's currently active QoS Profiles. Running on HLR server 364 is a location-based QoS logic 366. GPS satellites 320 allow mobile computing device 330 to get a current position fix, from which it detects that it has entered geofenced area 322.

According to this embodiment, when mobile computing device 330 detects that it has entered geofenced area 322, mobile computing device 330 sends a notice 370 specific to geofenced area 322 to HLR server 364. Notice 370 is sent via mobile computing device 330's radio connection to base station 332 and subsequently sent through connections between base station 332, base station controller 334, mobile switching center 340, and HLR server 364. HLR server 364 passes notice 370 to location-based QoS logic 366, which then commands HLR server 364 to make the QoS Profile associated with notice 370 the active QoS Profile for mobile computing device 330. In this embodiment, any user override of the change in active QoS Profile occurs before notice 370 is uploaded to mobile communications network. For instance, as soon as mobile computing device 330 detects its entrance into geofenced area 322, the user is queried to make sure he/she does not wish to override the change in active QoS Profile.

In an alternative embodiment of the present invention, instead of the mobile computing device fixing its position via a GPS connection and notifying the location-based QoS logic on the HLR server when the user enters a geofenced area, a server implementing an "enhanced cell ID" algorithm fixes the user's position and uploads this information to the location-based QoS logic on the HLR server periodically. In this embodiment, location-based QoS logic itself calculates when the user has entered a pre-set geofenced area.

Figure 4:
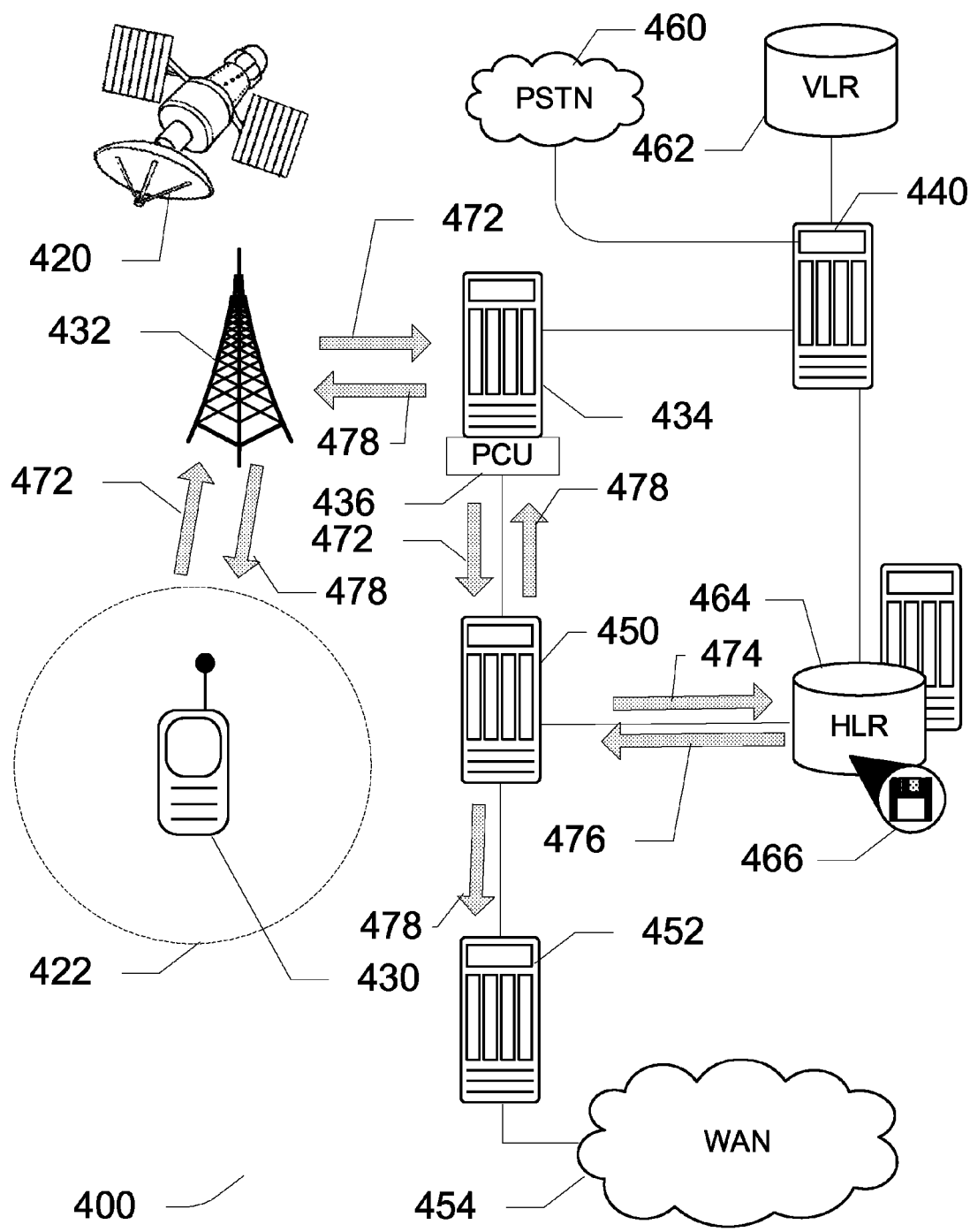
FIG. 4 displays a schematic diagram of the flow of information over a mobile communications network when a mobile computing device initiates a packet data session over the mobile communications network requiring QoS, according to an exemplary embodiment of the present invention.

FIG. 4 displays a schematic diagram of the flow of information over mobile communications network 400 when mobile computing device 430 initiates a packet data session over mobile communications network 400 requiring QoS, according to an exemplary embodiment of the present invention. In this embodiment, mobile computing device 430 sends a request 472 to initiate a packet data session to SPDSN 450 via its radio connection to base station 432 and subsequent connections between base station controller 434, packet control unit 436, and SPDSN 450. In this embodiment, note that not all requests by mobile computing device 430 to initiate a packet data session over mobile communications network 400 are associated with QoS requirements. Although SPDSN 450 always implements a level of QoS for any packet data session (even though this may simply be a default level of QoS such as "best effort"), some applications running on mobile computing device 430 may not have any particular QoS requirements. In such case, there is no need for SPDSN 450 to negotiate a level of QoS for the requested packet data session.

If request 472 does carry a requested level of QoS (for example, requests to initiate a VoIP call often carry with them stringent QoS requirements), SPDSN 450 sends an active QoS Profile request 474 to HLR server 464, which responds by sending SPDSN 450 an active QoS Profile 476 of the user of mobile computing device 430. As explained previously, active QoS Profile 476 is determined by location-based QoS logic 466 based on the geofenced area in which mobile computing device 430 is located. In this embodiment, the active QoS Profile attributes serve as maximum values for requested QoS attributes by mobile computing device 430. Thus, if the requested QoS attributes of request 472 exceed the values stored in active QoS Profile 476, the requested QoS attributes are re-set by SPDSN 450 to those maximum values. Based on the (possibly re-set) requested QoS attributes of request 472, SPDSN 450 determines a "negotiated" level of QoS for the packet data session. Such a determination entails evaluation of the level of congestion of mobile communications network 400 and possibly the level of congestion of other external networks in communication with mobile communications network 400. Thereupon, a plurality of QoS implementation instructions 478 are propagated throughout mobile communications network 400. The content and form of QoS implementation instructions 478 depend on the QoS protocol implemented in the network, but their purpose is to instruct network elements, including mobile computing device 430 itself, how to treat traffic from this packet data session as it migrates through the elements of mobile communications network 400. Depending on the QoS protocols implemented by mobile communications network 400, such instructions could include resource reservation, such as channel assignment; instructions on how to mark the traffic; etc.

Figure 5A:
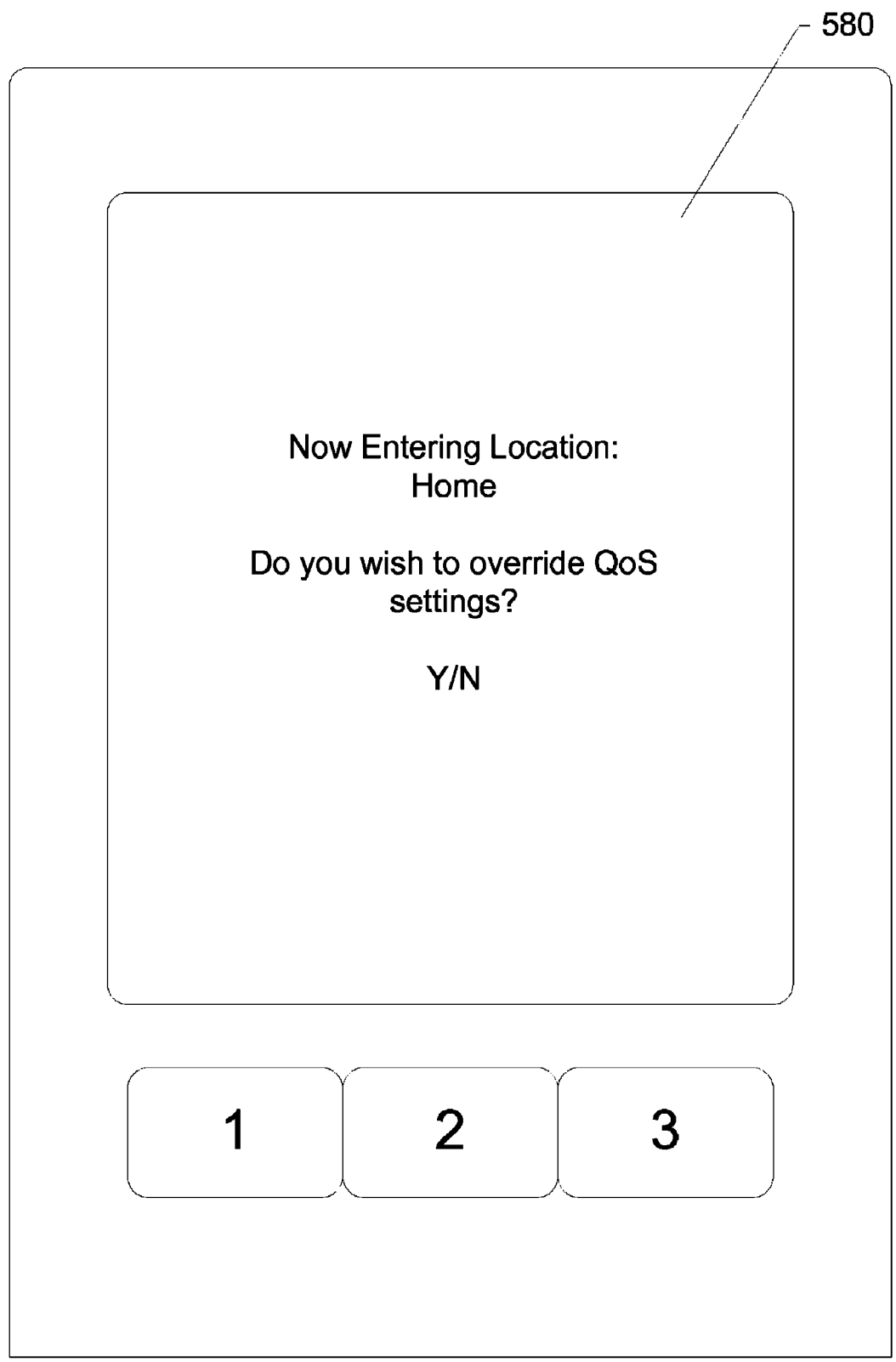
FIGS. 5*a*, 5*b*, and 5*c* display screenshots of a mobile computing device in operation while it is attached to a mobile communications network implementing location-based QoS, according to an exemplary embodiment of the present invention.
Figure 5B:
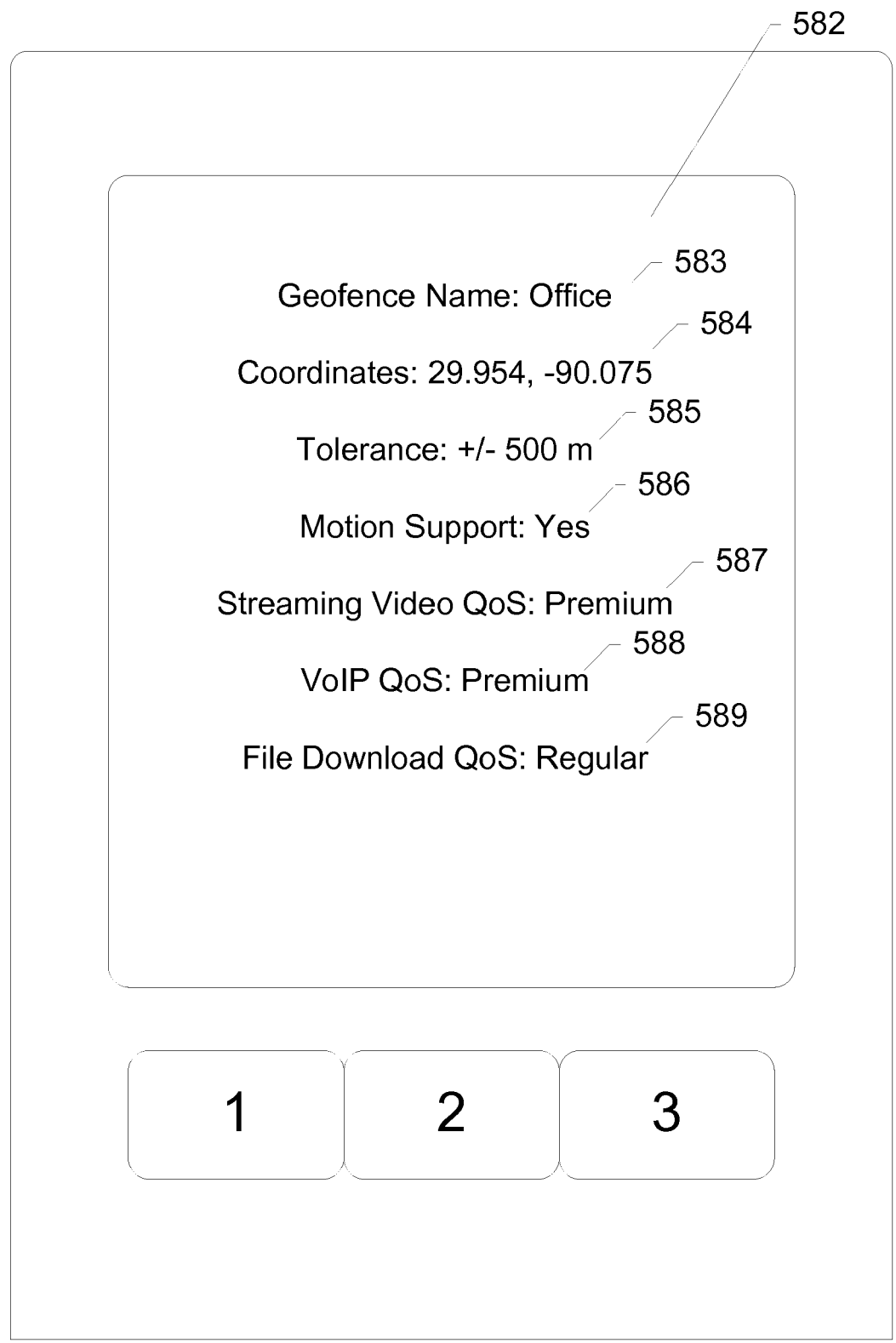
Figure 5C:
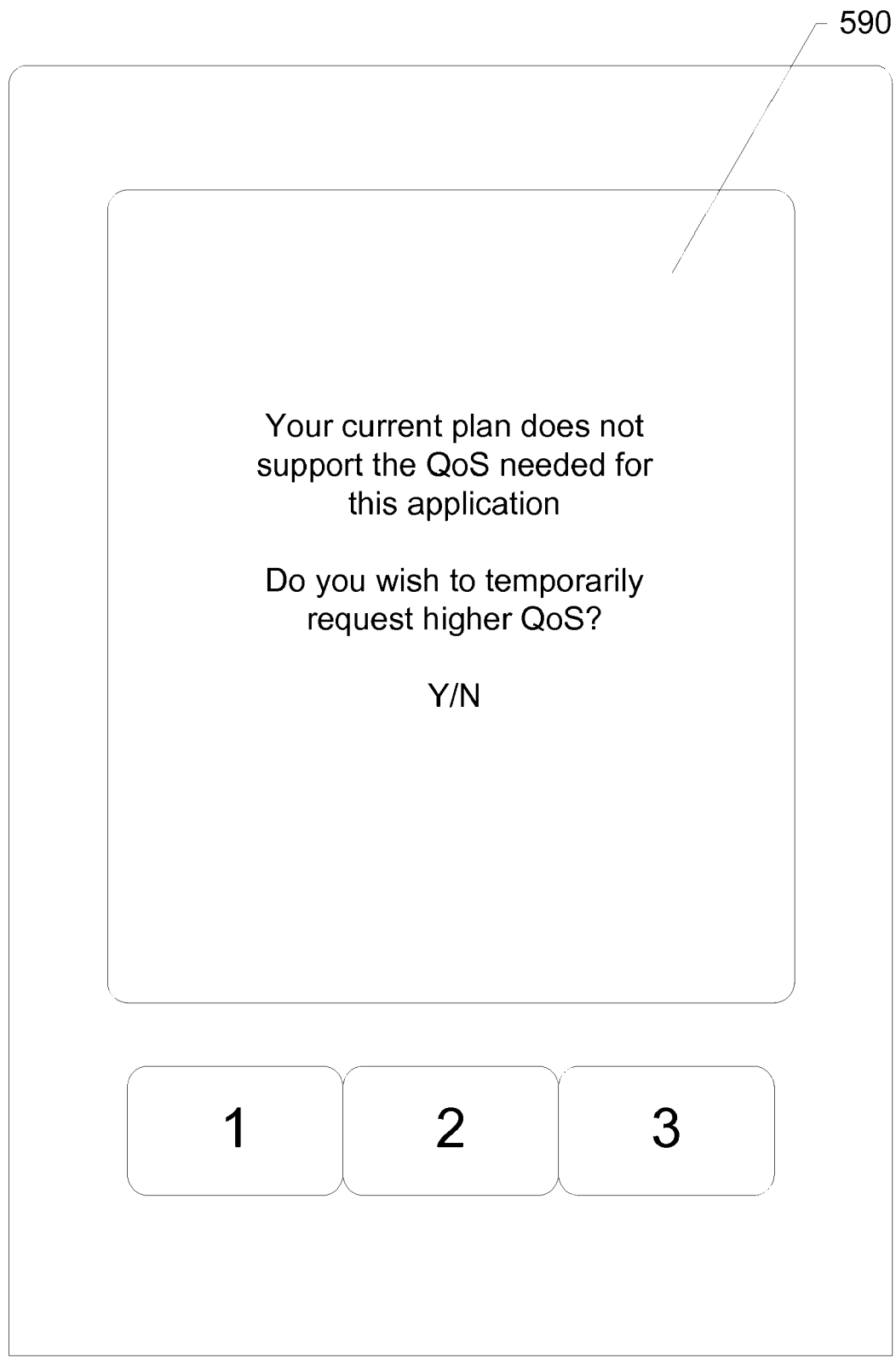

FIGS. 5a, 5b, and 5c display screenshots of a mobile computing device in operation while it is attached to a mobile communications network implementing location-based QoS, according to an exemplary embodiment of the present invention. These screenshots illustrate different features of this embodiment of the present invention.

FIG. 5a displays a screenshot 580 displayed when the user first enters a geofenced area, according to an exemplary embodiment of the present invention. In this embodiment, the user is entering a "Home" location, as seen in the screenshot. The user's device queries the user whether or not to override the set location-based QoS settings, allowing the user to override the associated change in the active QoS Profile via user input.

FIG. 5b displays a screenshot 582 displayed while the user sets up the location and QoS attributes associated with a particular geofenced area, according to an exemplary embodiment of the present invention. In this embodiment, the user is setting up a location named "Office". Such set-up allows the user to name the geofenced area, via a name field 583; set the latitude and longitude coordinates of the center of the geofenced area, via a coordinates field 584; set the radius of the geofenced area, via a tolerance field 585; allow the user to enable "motion support", via a motion support field 586; set a desired level of QoS for streaming video applications via streaming video QoS field 587; set a desired level of QoS for VoIP calls, via a VoIP QoS field 588; and finally set a desired level of QoS for file downloads, via a file download QoS field 589. For the ease of the user, different levels of QoS for these applications are given suggestive names ("Premium", "Regular", etc), though these names map to numerically specific requirements on specific QoS attributes (such as jitter, delay, etc.) in the SPDSN when the negotiated QoS is determined for the initiating application. In this embodiment, enabling motion support means that, within reasonable speed limits, the motion of the user does not affect his/her level of QoS, even though motion can place extra demands on the resources of the mobile communications network. For example, crossing multiple cell sites means that the mobile communications network needs to implement handover processes to maintain the connection between the mobile computing device and the network. After the user enters the desired values of these fields, the values are uploaded to the mobile communications network and stored as an available QoS Profile on the HLR server under the entered name.

FIG. 5c displays a screenshot 590 displayed when the user activates an application requiring a higher level of QoS than what is currently supported according to his/her active QoS Profile, according to an exemplary embodiment of the present invention. In this embodiment, the user is allowed to enable a requested level of QoS sufficient to support the functioning of the activated application. This may be accomplished by an entry on a keypad, touchscreen, etc. Note however that the actual negotiated level of QoS could still fall short of the required level of QoS. For example, if the mobile communications network is too congested with traffic the required level of QoS may not be met. Such a feature allows the user more flexibility in his/her provisioning of QoS and provides additional billing opportunities for the service provider of the mobile communications network.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of implementing location-based quality of service on a mobile communications network comprising:
   establishing a default quality of service profile for a mobile computing device;
   detecting when the mobile computing device has entered a geofenced area, the geofenced area associated with an alternate quality of service profile;

responsive to detecting that the mobile computing device has entered the geofenced area, determining whether a user has overridden the alternate quality of service profile in response to a query;

responsive to determining that the user has overridden the alternate quality of service profile in response to the query, implementing a first quality of service for the mobile computing device across the mobile communication network based on the default quality of service profile; and responsive to determining that the user has not overridden the alternate quality of service profile, establishing the alternate quality of service profile in place of the default quality of service profile and implementing a second quality of service for the mobile computing device across the mobile communications network based on the alternate quality of service profile.

2. The method of claim 1, wherein determining whether the user has overridden the alternate quality of service profile in response to the query comprises:

providing the query to the user via the mobile computing device; and receiving a response to the query from the mobile computing device, the response comprising one of a first request to override the alternate quality of service profile associated with the geofenced area and a second request to not override the alternate quality of service profile associated with the geofenced area.

3. The method of claim 1, wherein implementing the first quality of service for the mobile computing device across the mobile communication network based on the default quality of service profile comprises determining the first quality of service based on the default quality of service profile and a congestion level of the mobile communications network; and wherein implementing the second quality of service for the mobile computing device across the mobile communications network based on the alternate quality of service profile comprises determining the second quality of service based on the alternate quality of service profile and the congestion level of the mobile communications network.

4. The method of claim 1, further comprising:

receiving, from the mobile computing device, a plurality of set geofenced areas and a plurality of quality of service profiles, each of the plurality of set geofenced areas associated with one of the plurality of quality of service profiles, each of the plurality of quality of service profiles associated with a set of quality of service attributes.

5. The method of claim 1 implementing the first quality of service for the mobile computing device across the mobile communication network based on the default quality of service profile comprises:

receiving, from the mobile computing device, a request to establish a session on the mobile communications network using a requested quality of service; and responsive to receiving the request to establish the session, negotiating the first quality of service based on the requested quality of service and the default quality of service profile.

6. A system implementing location based quality of service on a mobile communications network comprising:

a processor; and a memory coupled to the processor, the memory comprising instructions that, when executed by the processor, cause the processor to perform operations comprising:

establishing a default quality of service profile for a mobile computing device;

detecting when the mobile computing device has entered a geofenced area, the geofenced area associated with an alternate quality of service profile;

responsive to detecting that the mobile computing device has entered the geofenced area, determining whether a user has overridden the alternate quality of service profile in response to a query;

responsive to determining that the user has overridden the alternate quality of service profile in response to the query, implementing a first quality of service for the mobile computing device across the mobile communication network based on the default quality of service profile; and responsive to determining that the user has not overridden the alternate quality of service profile, establishing the alternate quality of service profile in place of the default quality of service profile and implementing a second quality of service for the mobile computing device across the mobile communications network based on the alternate quality of service profile.

7. The system of claim 6, wherein determining whether the user has overridden the alternate quality of service profile in response to the query comprises:

providing the query to the user via the mobile computing device; and receiving a response to the query from the mobile computing device, the response comprising one of a first request to override the alternate quality of service profile associated with the geofenced area and a second request to not override the alternate quality of service profile associated with the geofenced area.

8. The system of claim 6, wherein implementing the first quality of service for the mobile computing device across the mobile communication network based on the default quality of service profile comprises determining the first quality of service based on the default quality of service profile and a congestion level of the mobile communications network; and wherein implementing the second quality of service for the mobile computing device across the mobile communications network based on the alternate quality of service profile comprises determining the second quality of service based on the alternate quality of service profile and the congestion level of the mobile communications network.

9. The system of claim 6, wherein the memory comprises further instructions that, when executed by the processor, cause the processor to perform further operations comprising:

receiving, from the mobile computing device, a plurality of set geofenced areas and a plurality of quality of service profiles, each of the plurality of set geofenced areas associated with one of the plurality of quality of service profiles, each of the plurality of quality of service profiles associated with a set of quality of service attributes.

10. The system of claim 6, wherein implementing the first quality of service for the mobile computing device across the mobile communication network based on the default quality of service profile comprises:

receiving, from the mobile computing device, a request to establish a session on the mobile communications network using a requested quality of service; and responsive to receiving the request to establish the session, negotiating the first quality of service based on the requested quality of service and the default quality of service profile.

11. A computer-readable storage device having instructions stored thereon for execution by a processor to perform operations for implementing location-based quality of service on a mobile communications network, the operations comprising:

establishing a default quality of service profile for a mobile computing device;

detecting when the mobile computing device has entered a geofenced area, the geofenced area associated with an alternate quality of service profile;

responsive to detecting that the mobile computing device has entered the geofenced area, determining whether a user has overridden the alternate quality of service profile in response to a query;

responsive to determining that the user has overridden the alternate quality of service profile in response to the query, implementing a first quality of service for the mobile computing device across the mobile communication network based on the default quality of service profile; and responsive to determining that the user has not overridden the alternate quality of service profile, establishing the alternate quality of service profile in place of the default quality of service profile and implementing a second quality of service for the mobile computing device across the mobile communications network based on the alternate quality of service profile.

12. The computer-readable storage device of claim 11, wherein determining whether the user has overridden the alternate quality of service profile in response to the query comprises:

providing the query to the user via the mobile computing device; and receiving a response to the query from the mobile computing device, the response comprising one of a first request to override the alternate quality of service profile associated with the geofenced area and a second request to not override the alternate quality of service profile associated with the geofenced area.

13. The computer-readable storage device of claim 11, wherein implementing the first quality of service for the mobile computing device across the mobile communication network based on the default quality of service profile comprises determining the first quality of service based on the default quality of service profile and a congestion level of the mobile communications network; and wherein implementing the second quality of service for the mobile computing device across the mobile communications network based on the alternate quality of service profile comprises determining the second quality of service based on the alternate quality of service profile and the congestion level of the mobile communications network.

14. The computer-readable storage device of claim 11, wherein the operations further comprise:

receiving, from the mobile computing device, a plurality of set geofenced areas and a plurality of quality of service profiles, each of the plurality of set geofenced areas associated with one of the plurality of quality of service profiles, each of the plurality of quality of service profiles associated with a set of quality of service attributes.

15. The computer-readable storage device of claim 11, wherein implementing the first quality of service for the mobile computing device across the mobile communication network based on the default quality of service profile comprises:

receiving, from the mobile computing device, a request to establish a session on the mobile communications network using a requested quality of service; and responsive to receiving the request to establish the session, negotiating the first quality of service based on the requested quality of service and the default quality of service profile.

\* \* \* \* \*